United States Patent [19]
Dai et al.

[11] Patent Number: 5,453,411
[45] Date of Patent: Sep. 26, 1995

[54] MILD HYDROCRACKING OF HEAVY HYDROCARBON FEEDSTOCKS EMPLOYING SILICA-ALUMINA CATALYSTS

[75] Inventors: Pei-Shing E. Dai; Charles N. Campbell, II, both of Port Arthur; Bobby R. Martin, Beaumont; Randall H. Petty, Port Neches, all of Tex.

[73] Assignee: Texaco Inc., White Plains, N.Y.

[21] Appl. No.: 199,923

[22] Filed: Feb. 22, 1994

Related U.S. Application Data

[62] Division of Ser. No. 890,206, May 29, 1992, Pat. No. 5,220,743.

[51] Int. Cl.$^6$ ....................................... B01J 27/14
[52] U.S. Cl. ......................... 502/315; 502/211; 502/213
[58] Field of Search ................................ 502/211, 213, 502/315

[56] References Cited

U.S. PATENT DOCUMENTS 3,755,147  8/1973  Michelson ........................ 208/211
4,426,279  1/1984  Antos et al. ...................... 502/213
4,463,104  7/1984  Antos et al. ...................... 502/213

*Primary Examiner*—Helane Myers
*Attorney, Agent, or Firm*—Kenneth R. Priem; Richard A. Morgan; Walter D. Hunter

[57] ABSTRACT

A mild hydrocracking process for the hydrodemetallation (HDM), hydrodesulfurization (HDS) and hydroconversion (HC) of hydrocarbon feedstocks such as residuum feedstocks which provides increased conversion of the 1000° F.+ hydrocarbon fraction to the 1000° F.− fraction and increased yields of middle distillates is disclosed. The process utilizes a catalyst comprising about 2.0 to about 6.0 wt. % of an oxide of a Group VIII metal, about 12.0 to about 25.0 wt. % of an oxide of molybdenum and 0 to about 3.0 wt. % of an oxide of phosphorus supported on a porous alumina support containing about 4.0 to about 30 wt. % of silica.

7 Claims, No Drawings

MILD HYDROCRACKING OF HEAVY HYDROCARBON FEEDSTOCKS EMPLOYING SILICA-ALUMINA CATALYSTS

This is a division, of application Ser. No. 07/890,206, filed May 29, 1992, now U.S. Pat. No. 5,320,743.

BACKGROUND OF THE INVENTION

1. Field of the Invention

This invention relates to a process for mild hydrocracking of heavy oils. More particularly, this invention relates to a catalytic process for converting heavy oils boiling above 650° F., such as vacuum gas oil (VGO) and VGO containing a high proportion of vacuum resid (VR) to lighter distillate products boiling at or below 650° F.

In the mild hydrocracking process of this invention a sulfur- and metal-containing hydrocarbon feedstock, such as residua containing heavy oils, is contacted at an elevated temperature with hydrogen and a catalyst composition comprising a specified amount of a Group VIII metal, such as an oxide of nickel or cobalt, a specified amount of an oxide of molybdenum and, optionally, a specified amount of an oxide of phosphorus, such as phosphorus pentoxide supported on a porous silica-containing alumina support. In the catalytic mild hydrocracking process of this invention the sulfur- and metal-containing hydrocarbon feed is contacted with hydrogen and the catalyst, which has a specified pore size distribution, in a manner such that a substantially higher conversion of the 1000° F.+ fraction of the hydrocarbon feed to the 1000° F.− lighter products is achieved over that obtained with the use of prior art hydroprocessing catalysts while at the same time high levels of sediment formation are avoided.

2. Prior Art

U.S. Pat. No. 4,941,964, incorporated herein by reference, discloses a process for the hydrotreatment of a sulfur- and metal-containing hydrocarbon feed which comprises contacting the feed with hydrogen and a catalyst in a manner such that the catalyst is maintained at isothermal conditions and is exposed to a uniform quality of feed. The catalyst has a composition comprising 3.0–5.0 wt. % of an oxide of a Group VIII metal, 14.5–24.0 wt. % of an oxide of a Group VIB metal and 0–2.0 wt. % of an oxide of phosphorus supported on a porous alumina support, and the catalyst is further characterized by having a total surface area of 150–210 m²/g and a total pore volume (TPV) of 0.50–0.75 cc/g with a pore diameter distribution such that micropores having diameters of 100–160 Å constitute 70–85% of the total pore volume of the catalyst and macropores having diameters of greater than 250 Å constitute 5.5–22.0% of the total pore volume of the catalyst.

U.S. Pat. No. 4,670,132 (Arias, et al.) discloses a catalyst preparation and a catalyst composition useful in the hydroconversion of heavy oils, the catalyst comprising a high iron content bauxite with the addition of one or more of the following promoters: phosphorus, molybdenum, cobalt, nickel or tungsten. The bauxite catalysts typically contain 25–35 wt. % aluminum. The catalysts have certain characteristic features for the elemental components (including aluminum and where present, molybdenum) when the pellet exteriors are examined in the fresh oxide state using X-ray photoelectron spectroscopy (XPS). For those catalysts which contain molybdenum, the surface Mo/Al atomic ratios on the pellet exteriors are in the range of 0.03 to 0.09.

U.S. Pat. No. 4,652,545 (Lindsley, et al.) discloses a catalyst composition useful in the hydroconversion of heavy oils, the catalyst containing 0.5–5% Ni or Co and 1.8–18% Mo (calculated as the oxides) on a porous alumina support, such as alumina containing a minor amount of silica, having 15–30% of the Ni or Co in an acid extractable form, and further characterized by having a TPV of 0.5–1.5 cc/g with a pore diameter distribution such that (i) at least 70% TPV is in pores having 80–120 Å diameters, (ii) less than 0.03 cc/g of TPV (6% TPV) is in pores having diameters of less than 80 Å and (iii) 0.05–0.1 cc/g of TPV (3–20% TPV) is in pores having diameters of greater than 120 Å. Lindsley, et al. is distinguished from the instant invention in that although it teaches that having a proportion of nickel or cobalt contained in its catalyst in an acid extractable form is advantageous in terms of heavy oil hydroconversion. Lindsley, et al. does not teach or suggest that catalysts which have a prescribed molybdenum gradient are advantageous in terms of heavy oil hydroconversion.

U.S. Pat. No. 4,588,709 (Morales, et al.) discloses a catalyst preparation and a catalyst composition useful in the hydroconversion of heavy oils, the catalyst comprising 5–30 wt. % of a Group VIB element (e.g., molybdenum) and 1–5 wt. % of a Group VIII element (e.g., nickel). Morales, et al. indicate that the finished catalysts have average pore diameters of 150 to 300 Angstroms. The catalysts have certain characteristic features for the active components (Mo and Ni) when the pellet exteriors are examined in a sulfided state using X-ray photoelectron spectroscopy (XPS). Morales ('709) requires a large average pore diameter (150 to 300 Angstroms) and Morales ('709) requires certain characteristic XPS features of the pellet exteriors after presulfiding.

U.S. Pat. No. 4,579,649 (Morales, et al.) discloses a catalyst preparation and a catalyst composition useful in the hydroconversion of heavy oils, the catalyst containing a Group VIB element (e.g., molybdenum), a Group VIII element (e.g., nickel) and phosphorus oxide on a porous alumina support. The catalyst has certain characteristic features for the three active components (Mo, Ni and P) where the pellet exteriors are examined in a sulfided state using X-ray photoelectron spectroscopy (XPS). Morales ('649) requires certain characteristic XPS features of the pellet exteriors after presulfiding whereas the catalyst of the instant invention requires a specified molybdenum gradient as determined by measuring the molybdenum/aluminum atomic ratios by XPS for catalyst pellet exteriors and the pellets in a crushed form as measured on the fresh catalysts in an oxide state.

U.S. Pat. No. 4,520,128 (Morales, et al.) discloses a catalyst preparation and a catalyst composition useful in the hydroconversion of heavy oils, the catalyst containing 5–30 wt. % of a Group VIB element (e.g., molybdenum), 0.1–8.0 wt. % of a Group VIII element (e.g., nickel) and 5–30 wt. % of a phosphorus oxide on a porous alumina support. The finished catalysts of Morales ('128) have mean pore diameters of 145 to 154 Angstroms. The catalyst has certain characteristic features for the three active components (Mo, Ni and P) when the pellet exteriors are examined in a sulfided state using X-ray photoelectron spectroscopy (XPS). The catalyst of Morales requires a high phosphorus oxide content.

U.S. Pat. No. 5,047,142 (Sherwood, Jr., et al.) discloses a process of hydroprocessing a sulfur- and metal-containing hydrocarbon feed which comprises contacting said feed with hydrogen and a catalyst in a manner such that the catalyst is maintained at isothermal conditions and is exposed to a uniform quality of feed, where said catalyst has a composition comprising 1.0–5.0 wt. % of an oxide of nickel or cobalt and 10.0–25.0 wt. % of an oxide of molybdenum, all supported on a porous alumina support in such a manner that the molybdenum gradient of the catalyst has a value of less than 6.0, 15–30% of the nickel or cobalt is in an acid extractable form, and said catalyst is further characterized by having a total surface area of 150–210 m$^2$/g, a total pore volume of 0.50–0.75 cc/g, and a pore size distribution such that pores having diameters of less than 100 Å constitute less than 25.0%, pores having diameters of 100–160 Å constitute 70.0–85.0% and pores having diameters of greater than 250 Å constitute 1.0–15.0% of the total pore volume of said catalyst.

U.S. Pat. No. 4,886,582 (Simpson) discloses a catalyst comprising at least one metal hydrogenating component comprising Group VIB, such as molybdenum, or Group VIII metal, such as nickel, on a porous refractory oxide, such as lithia-alumina, silicaalumina, etc., said composition comprising less than 15 wt. % of said metal hydrogenation component calculated as the trioxide, and having a pore size distribution where at least 75% of the total pore volume is in pores of diameters from about 20 Angstroms below the pore mode diameter to about 20 Angstroms above the pore mode diameter, less than 10% of the total pore volume is in pores of diameters less than 60 Angstroms and greater than 3% to less than 10% of the total pore volume is in pores greater than 110 Angstroms and the pore mode diameter is in the range of about 70 to about 90 Angstroms.

U.S. Pat. No. 4,846,961 (Robinson, et al.) discloses a hydroprocessing catalyst containing nickel, phosphorus and about 19 to about 21.5 wt. % of molybdenum (MoO$_3$) components on a porous refractory oxide such as silica-alumina. The catalyst has a narrow pore size distribution wherein at least 75% of the pore volume is in pores of diameters from about 50 to about 110 Angstroms, at least 10% of the pore volume in pores of diameters less than 70 Angstroms and at least 60% of the pore volume in pores of diameters within about 20 Angstroms above or below the average pore diameter. The catalyst is employed to hydroprocess a hydrocarbon oil, especially those oils containing sulfur and nitrogen components.

U.S. Pat. No. 4,686,030 (Ward, et al.) discloses a mild hydrocracking process using a catalyst containing at least one active hydrogenation metal component supported on an amorphous porous refractory oxide such as silica-alumina wherein the catalyst has a narrow pore size distribution including at least 75% of the total pore volume in pores of diameters from about 50 to about 130 Angstroms. Preferably, the catalyst has at least about 60% of the pore volume in pores of diameter within about 20 Angstroms above or below a mode pore diameter in the range from about 55 to about 100 Angstroms. In one embodiment, a vacuum gas hydrocarbon oil is mildly hydrocracked, with simultaneous desulfurization and denitrogenation, by contact with the catalyst under mild hydrocracking conditions correlated so as to convert about 10 to about 50 Vol % of the oil fraction boiling above 700° F. to hydrocarbon products boiling at or below about 700° F. In other embodiments, the hydrocarbon oil may be desulfurized and denitrogenated either prior to or following the mild hydrocracking.

SUMMARY OF THE INVENTION

The instant invention is a process of mild hydrocracking of a sulfur- and metal-containing hydrocarbon feedstock having a substantial proportion of components boiling below about 1000° F., such as residue, vacuum gas oils, etc., which comprises contacting the feedstock at an elevated temperature and at a pressure of less than 1500 psig with hydrogen and a catalyst which comprises about 2.0 to about 6.0 wt. %, preferably about 2.5 to about 3.5 wt. % of an oxide of a Group VIII metal, preferably nickel or cobalt; about 12.0 to about 25.0 wt. %, preferably about 12.0 to about 18.0 wt. % of an oxide of molybdenum; about 0 to about 3.0 wt. %, preferably about 0 to about 2.0 wt. % of an oxide of phosphorus, preferably P$_2$O$_5$, all supported on a porous silica-alumina support containing about 4.0 to about 30.0 wt. %, preferably about 4.0 to about 25.0 wt. %, based on the weight of the support, of silica. The molybdenum gradient of the catalyst ranges from about 1 to about 10, preferably from about 1 to about 6. This invention also related to the catalyst employed in the described process.

In one embodiment of this invention in which the catalyst is prepared using a silica-alumina support containing about 10 to about 25 wt. of silica, the catalyst has a total pore volume in the range of about 0.75 to about 0.92 cc/g, and a surface area in the range of about 150 to about 250 m$^2$/g. The pore volume distribution as determined by mercury porosimetry consists of about 25 to about 40% of the pore volume in pores with diameters greater than 250 Å, about 30 to about 50% of the pore volume in pores having diameters greater than 160 Å, about 50 to about 70% of the pore volume in pores with diameters less than 160 Å, and about 20 to about 40% of the pore volume in pores having diameters less than 100 Å. The pore mode of the catalyst as determined by the BET method is in the range of 80–120 Å. The preferred pore volume distribution as determined by mercury porosimetry consists about 28 to about 35% of the pore volume in pores with diameters greater than 250 Å, about 35 to about 45% of the pore volume in pores having diameters greater than 160 Å, about 55 to about 65% of the pore volume in pores with diameters less than 160 Å, and about 24 to about 32% of the pore volume in pores having diameters less than 100 Å. The pore mode of the catalyst as determined by the BET method is in the range of about 80 to about 120 Å.

In a second embodiment of this invention in which the catalyst is prepared using a silica-alumina support containing about 4 to about 10% of silica, the catalyst has a total pore volume in the range of about 0.60 to about 0.80 cc/g and a surface area in the range of about 150 to about 250 m$^2$/g. The pore volume distribution consists about 5 to about 15% of the pore volume in pores with diameters greater than 250 Å, about 10 to about 35% of the pore volume in pores having diameters greater than 160 Å, about 65 to about 85% of the pore volume in pores with diameters less than 160 Å, and about 0 to about 20% of the pore volume in pores having diameters less than 100 Å. The pore mode of the catalyst is in the range of about 100 to about 140 Å. The preferred pore volume distribution consists about 10 to about 15% of the pore volume in pores with diameters greater than 250 Å, about 20 to about 30% of the pore volume in pores having diameters greater than 160 Å, about 70 to about 80% of the pore volume in pores with diameters less than 160 Å, and 0 to about 10% of the pore volume in pores having diameters less than 100 Å. The pore mode of the catalyst is in the range of about 100 to about 140 Å.

The use of the catalysts of this invention not only provides a hydrocarbon conversion advantage but also maintains the sediment-make at a level similar to the conventional bimodal alumina based catalysts. The instant invention is much improved over the prior art catalysts in terms of sediment formation and reactor unit operability.

The operating conditions for the process of the instant invention are such as to yield about a 10 to about a 60 vol % conversion of the hydrocarbon feedstock boiling at 650° F.+ to hydrocarbon products boiling at 650° F.−.

The residuum feedstocks may be contacted with hydrogen and the catalyst utilizing a wide variety of reactor types. Preferred means for achieving such contact include contacting the feed with hydrogen and the prescribed catalyst in a fixed bed hydrotreater, in a single continuous-stirred-tank reactor or single ebullated-bed reactor, or in a series of 2–5 continuous-stirred-tank or ebullated-bed reactors, with ebullated-bed reactors being particularly preferred. The process of the instant invention is particularly effective in achieving high conversion rates of 1000° F.+ to 1000° F.− fractions while maintaining desirable levels of 650° F.+ conversion, sediment make and HDS activity compared to the results obtained with the use of conventional bimodal alumina-based catalysts.

DESCRIPTION OF THE PREFERRED EMBODIMENTS

The decreasing demand for heavy fuel oils has caused refiners to seek ways to convert heavier hydrocarbon feedstocks to lighter products of more value. To increase mid-distillate production, the refiner has several process options. They include hydrocracking, fluid catalytic cracking, and coking, which all require heavy investments in the refineries. Because of such high costs, refiners are continually searching for conversion processes which may be utilized in existing units. An additional option available to refiners is to employ a mild hydrocracking (MHC) process. MHC process is an evolution of the VGO hydrodesulfurization (HDS) process. The main feedstock for this MHC process is VGO but other types of heavy gas oils, such as coking gas oils and deasphalted oils, can be used.

The major advantage of MHC is that it can be carried out within the operating constraints of existing VGO hydrotreaters. The typical conditions for the MHC process are: Temperature: 720°–780° F., Hydrogen Pressure: 600–1200 psig, H$_2$/Oil Ratio: 1000–2000 SCF/BBL, Space Velocity: 0.4–1.5 Vol/Vol/Hr. In contrast, true high conversion hydrocracking units are operated at these conditions: Temperature: 700°–900° F., Hydrogen Pressure: 1800–3000 psig, H$_2$/Oil Ratio: 1400–6000 SCF/BBL, Space Velocity: 0.3–1.5 Vol/Vol/Hr. The major difference between the two processes is the hydrogen pressure.

The products obtained from the MHC process are low sulfur fuel oil (60–80%) and middle distillate (20–40%). This hydrotreated fuel oil is also an excellent feed for catalytic cracking because of its higher hydrogen content and lower nitrogen content compared to the original feed. The quality of diesel cut produced by MHC is usually close to diesel oil specifications for the cetane index, and so can be added to the diesel pool.

The switch from a HDS mode to a MHC mode can be achieved in different ways, assuming that the refiner is equipped to recover the surplus of the middle distillate fraction. One way to increase middle distillate production from a unit loaded with HDS catalyst is to increase the operating temperature. Using a conventional hydrotreating catalyst, the MHC process typically converts about 10 to 30 Vol % of hydrocarbon feedstock boiling above 650° F. (650° F.+) to middle distillate oils boiling at or below 650° F. (650° F.−).

Another way to increase the middle distillate production is to change, at least partly, a HDS catalyst on a nonacidic alumina support to a slightly acidic catalyst. Catalysts of higher activity are still being sought. The higher the activity of the catalyst, the lower the temperature required to obtain a product of given sulfur, nitrogen or metal content in any given boiling range. For the VGO containing a high proportion of residuum, an HDS catalyst usually gives less than 10 Vol % conversion of the 650° F.+ fraction. The conversion of resid components boiling above 1000° F. (1000° F.+) into products boiling at or below 1000° F. (1000° F.−) with the known alumina-based hydrotreating catalysts is achieved primarily by thermal cracking reactions.

A particular difficulty which arises in resid hydroprocessing units employing the currently known catalysts is the formation of insoluble carbonaceous substances (also called sediment) when the conversion is high (above 50 Vol %). High sediment may cause plugging of reactor or downstream units, such as a fractionation unit. The higher the conversion level for a given feedstock, the greater the amount of sediment formed. This problem is more acute at a low hydrogen pressure and high reaction temperature.

The process of the instant invention employs a catalyst composition comprising about 2.0–6.0, preferably 2.5–3.5 wt. % of an oxide of a Group VIII metal, preferably nickel or cobalt, most preferably NiO about 12.0 to about 25.0 wt. %, preferably about 12.0 to about 18.0 wt. % of an oxide of molybdenum, most preferably MoO$_3$ and about 0 to about 3.0, preferably 0 to about 2.0 wt. % of an oxide of phosphorus, preferably P$_2$O$_5$ all supported on a porous silica-alumina support containing about 4.0 to about 30.0 wt. %, preferably about 4.0 to about 25.0 wt. %, based on the weight of the support, of silica. Most preferably, the support is gamma alumina. Groups VIII, as referred to herein, is Groups VIII of the Periodic Table of Elements. The Periodic Table of Elements referred to herein is found on the inside cover of the CRC *Handbook of Chemistry and Physics*, 55th Ed. (1974–75). Other oxide compounds which may be found in such a catalyst composition include SO$_4$ (present in less than 0.8 wt. %), and Na$_2$O (present in less than 0.1 wt. %). The above-described silicaalumina support may be purchased or prepared by methods well known to those skilled in the art.

Catalyst Preparation

In preparing the catalyst the support containing silica is impregnated with the requisite amounts of the VIB metal oxide and Group VIII metal oxide and, optionally, phosphorus oxide via conventional means known to those skilled in the art to yield a finished catalyst containing a Group VIII metal oxide in the amount of 2.0 to about 6.0 wt. %, preferably about 2.5 to about 3.5 wt. %, molybdenum oxide in the amount of 12.0 to about 25.0 wt. %, preferably 12.0 to about 18.0 wt. % and phosphorus oxide in the amount of about 0 to about 3.0 wt. %, preferably 0 to about 0.1 wt. %.

The Group VIII metal may be iron, cobalt, or nickel which is loaded on the support, for example, as a 10–30 wt. %, preferably about 15 wt. % of an aqueous solution of metal nitrate. The preferred metal of this group is nickel which may be employed at about 16 wt. % aqueous solution of nickel nitrate hexahydrate. Molybdenum may be loaded on the support employing, for example, a 10–20 wt. %, preferably about 15 wt. %, of an aqueous solution of ammonium heptamolybdate (AHM). The phosphorus component, when utilized, may be prepared from 85% phosphoric acid.

The active metals and phosphorus may be loaded onto the catalyst support via pore filling. Although it is possible to load each metal separately, it is preferred to impregnate simultaneously with the Group VIII metal and molybdenum compounds, phosphoric acid, as well as with stabilizers such as hydrogen peroxide and citric acid (monohydrate), when employed. It is preferred that the catalyst be impregnated by filling 95–105%, for example, 97% of the support pore volume with the stabilized impregnating solution containing the required amount of metals and citric acid.

Finally, the impregnated support is oven-dried and then directly calcined preferably at 1000°–1150° F. for about 20 minutes to 2 hours in flowing air.

A hydroconversion process, such as a mild hydrocracking process, which preferentially removes sulfur and nitrogen from the converted product stream with components having boiling points less than 1000° F. is desirable in those instances where there is less concern over the quality of the unconverted product stream, but, rather, where the primary concern is the quality of the distillate product from the hydroconversion process. It is well known to those skilled in the art that high heteroatom contents of distillate hydroconversion products have an adverse effect on fluid catalytic cracking of the heavier gas oils (having a boiling point of about 650° F. to about 1000° F.) and that extensive hydrotreating of the distillate streams would be required to meet the strict mandated levels of heteroatoms in distillate fuels. The demands placed upon catalyst compositions make it difficult to employ a single catalyst in a hydroconversion process, such as a mild hydrocracking process, which will achieve effective levels of sulfur and nitrogen removal from the converted product stream having components with boiling points below 1000° F. However, the catalyst employed in the process of the instant invention is capable of achieving such results because the prescribed catalyst has an optimized micropore diameter to overcome the diffusion limitations for hydrotreatment of the converted product molecules but it also does not contain such large macropores that would allow poisoning of the catalyst pellet interior. As previously described, the catalyst also has a specified pore size distribution such that pores with diameters less than 55 Å are minimized as these pores are easily plugged with contaminants during hydroprocessing.

Catalyst Examples SN-6599, 6600, 6601, 6616 and 6602, the properties of which are described in Table I below, as well as Catalyst Examples SN-6922, 6923 and 6615, the properties of which are described in Table II below, are catalysts prepared in the manner set out above, which may be employed in the process of this invention while the properties of the Support SN-6599X used in processing Catalyst SN-6599, Support SN-6602X used in preparing Catalyst SN-6602 and Support SN-6923X employed in preparing Catalyst SN-6923 are IS described in Tables III and IV below. The catalysts were prepared with a commercially available silicaalumina support obtained from American Cyanamid and are available in the form of extrudates in the diameter range of 0.035–0.041 inch.

The silica content of the catalysts described in Tables I and II is based on the weight of the catalyst support.

TABLE I

NiMo CATALYSTS ON SILICA-ALUMINA SUPPORTS

| | Catalyst | | | | |
|---|---|---|---|---|---|
| | SN-6599 | SN-6600 | SN-6601 | SN-6616 | SN-6602 |
| Impreg. Sol'n. | NiMo ($H_2O_2$) | NiMo ($H_2O_2$) | NiMo ($H_2O_2$) | NiMo (Citric Acid) | NiMo (Phosphoric Acid) |
| $SiO_2$ wt. % | 4 | 8 | 16 | 16 | 8 |
| $P_2O_5$ wt. % | 0 | 0 | 0 | 0 | 1.6 |
| NiO Wt. % | 3.3 | 3.3 | 3.2 | 3.2 | 3.2 |
| $MoO_3$ wt. % | 14.1 | 13.3 | 11.4 | 14.7 | 13.5 |
| Pore Volume Distribution by Hg Porosimetry; Surface Area by Nitrogen BET | | | | | |
| Total PV, cc/g | 0.64 | 0.77 | 0.85 | 0.79 | 0.67 |
| PV > 250Å % TPV | 10.7 | 14.3 | 31.8 | 32.9 | 9.0 |
| PV > 160Å % TPV | 14.1 | 32.5 | 39.8 | 41.8 | 22.4 |
| PV < 160Å % TPV | 84.4 | 67.5 | 61.2 | 59.4 | 76.1 |
| PV < 100Å % TPV | 15.6 | 5.2 | 31.8 | 35.9 | 7.5 |
| PV < 55Å % TPV | 0 | 0 | 0.5 | 0 | 0 |
| PV 100–160Å % TPV | 70.3 | 62.3 | 30.6 | 31.6 | 68.7 |
| PM at (dv/dD) max Å | 115 | 138 | 83 | 79 | 132 |
| PM (BET), Å | 106 | 138 | 88 | 68 | 129 |
| Surf. Area, $m^2/g$ | 194 | 171 | 198 | 193 | 163 |
| HDS-MAT, $C_{0.5g}$, % | 93 | 87 | 64 | 57 | 69 |
| Metals Distribution by XPS Analysis | | | | | |
| $(Mo/Al)_{int}$ | 0.12 | 0.10 | 0.08 | 0.08 | 0.11 |
| $(Ni/Al)_{int}$ | 0.013 | 0.015 | 0.012 | 0.010 | 0.018 |
| Mo Gradient | 6.0 | 5.4 | 7.9 | 1.12 | 5.8 |
| Ni Gradient | 1.4 | 1.1 | 1.8 | 1.2 | 1.4 |

TABLE II

NiMo CATALYSTS ON SILICA-ALUMINA SUPPORTS

| | Catalyst | | |
|---|---|---|---|
| | SN-6922 | SN-6923 | SN-6615 |
| Impreg. Sol'n. | Ni—Mo (Citric Acid) | Ni—Mo (Citric Acid) | Ni—Mo (Phosphoric Acid) |
| $SiO_2$ wt. % | 16 | 16 | 16 |

TABLE II-continued

NiMo CATALYSTS ON SILICA-ALUMINA SUPPORTS

| | Catalyst | | |
| --- | --- | --- | --- |
| | SN-6922 | SN-6923 | SN-6615 |
| $P_2O_5$ wt. % | 0 | 0 | 1.6 |
| $MoO_3$ wt. % | 14.2 | 14.2 | 15.0 |
| NiO Wt. % | 3.1 | 2.8 | 3.2 |
| Total PV, % TPV | 0.88 | 0.82 | 0.78 |
| PV > 250Å % TPV | 28.4 | 31.7 | 33.3 |
| PV > 160Å % TPV | 36.4 | 40.2 | 42.3 |
| PV < 55Å % TPV | 2.2 | 1.9 | |
| PV < 160Å % TPV | 63.6 | 59.8 | 57.7 |
| PV < 100Å % TPV | 35.2 | 24.4 | 25.6 |
| PV 100–160Å | 28.4 | 34.1 | 32.1 |
| PM at (dv/dD) max Å | 93 | 110 | 88 |
| PM (BET), Å | 98 | 109 | 84 |
| Surf. Area, $m^2/g$ | 239 | 193 | 173 |
| HDS-MAT, $C_{0.5g}$, % | 92 | 84 | 50 |
| Metals Distribution by XPS Analysis | | | |
| $(Mo/Al)_{int}$ | 0.11 | 0.10 | 0.10 |
| $(Ni/Al)_{int}$ | 0.010 | 0.009 | 0.010 |
| Mo Gradient | 2.2 | 3.7 | 1.4 |
| Ni Gradient | 1.8 | 3.1 | 1.3 |

TABLE III

PROPERTIES OF SILICA-ALUMINA SUPPORTS

| | Catalyst Support | | |
| --- | --- | --- | --- |
| | SN-6599X | SN-6602X | SN-6923X |
| $SiO_2$ wt. % | 4 | 8 | 16 |

TABLE III-continued

PROPERTIES OF SILICA-ALUMINA SUPPORTS

| | Catalyst Support | | |
| --- | --- | --- | --- |
| | SN-6599X | SN-6602X | SN-6923X |
| $NH_3$ Desorbed, cc/g | 11.8 | 10.6 | 11.1 |
| Pore Volume Distribution by Hg Porosimetry | | | |
| TPV, cc/g | 0.81 | 0.85 | 1.04 |
| PV > 250Å % TPV | 8.6 | 11.8 | 24.0 |
| PV > 160Å % TPV | 14.8 | 25.9 | 40.4 |
| PV < 160Å % TPV | 85.2 | 75.3 | 59.6 |
| PV < 100Å % TPV | 19.8 | 14.1 | 20.2 |
| PV 100–160Å % TPV | 65.4 | 61.2 | 39.4 |
| MPD (Vol), Å | 117 | 128 | 102 |
| TSA ($N_2$), $m^2g$ | N/A | 187 | N/A |

Note: The suffix X denotes the support for the catalyst of the same number. The contact angle used in the determination of Median Pore Mode by Volume denoted as MPD (Vol) for the supports and the finished catalysts was 140 and 130 degrees, respectively.

TABLE IV

NiMo CATALYSTS ON SILICA-ALUMINA SUPPORTS

| | SN-6616X | SN-6616 | SN-6600X | SN-6600 | SN-6922X | SN-6922 |
| --- | --- | --- | --- | --- | --- | --- |
| Impreg. Sol'n. | Support | Catalyst Ni—Mo (Citric Acid) | Support | Catalyst Ni—Mo ($H_2O_2$) | Support | Catalyst Ni—Mo (Citric Acid) |
| $NH_3$ Desorbed, cc/g | 4.7 | | 11.0 | | 11.1 | |
| $SiO_2$, wt. % | 16 | | 8.0 | | 16 | |
| $MoO_3$, wt. % | | 14.7 | | 13.3 | | 14.2 |
| NiO, wt. % | | 3.2 | | 3.3 | | 3.1 |
| Pore Volume Distribution by Hg Porosimetry | | | | | | |
| TPV, cc/g | 1.04 | 0.79 | 0.99 | 0.77 | 1.06 | 0.88 |
| PV > 250Å % TPV | 32.7 | 31.6 | 15.2 | 14.3 | 30.2 | 28.4 |
| PV > 150Å % TPV | 41.3 | 35.4 | 34.3 | 32.5 | 36.8 | 36.4 |
| PV < 160Å % TPV | 58.7 | 59.5 | 65.7 | 67.5 | 63.2 | 63.6 |
| PV < 100Å % TPV | 36.8 | 30.4 | 9.1 | 5.2 | 40.6 | 36.2 |
| PV 100–160Å % TPV | 27.9 | 29.1 | 56.6 | 62.3 | 22.6 | 28.4 |
| as % of PV < 250Å | 41 | 43 | 67 | 73 | 32 | 39 |
| MBD (Vol), Å | 104 | 105 | 114 | N/A | 87 | 93 |
| TSA ($N_2$), $m^2/g$ | 212 | 187 | N/A | 171 | N/A | 239 |

Note: The suffix X denotes the support for the catalyst of the same number. The contact angle used in the determination of Median Pore Mode by Volume denotes as MPD (Vol) for the supports and the finished catalyst was 140 and 130 degrees, respectively.

The properties of two commercially available hydroprocessing catalysts are set forth in Table V below. All of these catalysts are available state of the art catalysts sold for use in hydroprocessing resid oils. Catalyst A, which is American Cyanamid HDS-1443B catalyst, is referred to in this specification as the standard reference catalyst.

Pore structure values set out in Tables I–V were determined using Micrometrics Autopore 9220 Mercury Porosimetry Instrument. In the tables reference to BET means values measured by the Brunauer-Emmett-Teller Techniques.

TABLE V

ALUMINA BASED CATALYSTS AS CONTROL EXAMPLES

| | Catalyst | |
|---|---|---|
| | A | B |
| Impreg. Sol'n. | Ni—Mo | Ni–Mo |
| $MoO_3$ wt. % | 11.5–14.5 | 14.5–15.5 |
| NiO wt. % | 3.2–4.0 | 3.0–3.5 |
| Pore Volume Distribution by Hg Porosimetry | | |
| Total PV, cc/g | 0.74 | 0.64 |
| PV > 250Å % TPV | 33.8 | 7.8 |
| PV > 160Å % TPV | 37.8 | 17.2 |
| PV < 160Å % TPV | 62.2 | 84.4 |
| PV < 100Å % TPV | 58.1 | 9.4 |
| PV 100–160Å % TPV | 4.1 | 75.1 |
| PM at (dv/dD) max Å | 50 | 126 |
| PM (BET), Å | 46 | 105 |
| Surf. Area, $m^2/g$ | 314 | 194 |
| HDS-MAT, $C_{0.5g}$, % | 73 | 88 |
| Metals Distribution by XPS Analysis | | |
| $(Mo/Al)_{int}$ | 0.09 | 0.012 |
| $(Ni/Al)_{int}$ | 0.012 | 0.016 |
| Mo Gradient | 1.2 | 3.1 |
| Ni Gradient | 1.6 | 1.0 |

A preferred feature of the catalyst composition of the instant invention is that the above-described oxide of molybdenum, preferably $MoO_3$, is distributed on the above-described porous alumina support in such a manner that the molybdenum gradient of the catalyst has a value of about 1.0 to about 10.0, As used in this description and in the appended claims, the phrase "molybdenum gradient" means that the ratio of a given catalyst pellet exterior molybdenum/aluminum atomic ratio to a given catalyst pellet interior molybdenum/aluminum atomic ratio has a value of less than 6.0, preferably 1.0–5.0, the atomic ratios being measured by X-ray photoelectron spectroscopy (XPS), sometimes referred to as Electron Spectroscopy for Chemical Analysis (ESCA). It is theorized that the molybdenum gradient is strongly affected by the impregnation of molybdenum on the catalyst support and the subsequent drying of the catalyst during its preparation. ESCA data on both catalyst pellet exteriors and interiors were obtained on an ESCALAB MKII instrument available from V. G. Scientific Ltd., which uses a 1253.6 electron volt magnesium X-ray source. Atomic percentage values were calculated from the peak areas of the molybdenum $3_{p3/2}$ and aluminum $2_{p3/2}$ signals using the sensitivity factors supplied by V. G. Scientific Ltd. The value of 74.7 electron volts for aluminum was used as a reference binding energy.

To determine the molybdenum/aluminum atomic ratio of a given catalyst pellet exterior for the catalyst of the instant invention, the catalyst pellets were stacked flat on a sample holder, and subjected to ESCA analysis. For the catalyst of the instant invention the molybdenum/aluminum atomic ratio of the catalyst pellet exterior is in the range of 0.12–0.75, preferably 0.12–0.42. This exterior molybdenum/aluminum atomic ratio is considerably greater than the Mo/Al catalyst surface atomic ratio of 0.03–0.09 disclosed in U.S. Pat. No. 4,670,132.

To determine the molybdenum/aluminum atomic ratio of a given catalyst pellet interior for the catalyst of the instant invention, the catalyst pellets were crushed into a powder, placed firmly in a sample holder, and subjected to ESCA analysis. For the catalyst of the instant invention, the molybdenum/aluminum atomic ratio of the catalyst pellet interior (i.e., the molybdenum/aluminum ratio of the powder, which is assumed to be representative of the interior portion of the pellet) is in the range of 0.08–0.15, preferably 0.11–0.12.

The molybdenum/aluminum atomic ratios of the total catalyst composition of the instant invention, as determined by conventional means (i.e., Atomic Absorption (AA) or Inductively Coupled Plasma (ICP) spectroscopies) is in the range of 0.060–0.075, preferably 0.062–0.071. To determine the total catalyst composition molybdenum/aluminum atomic ratio, catalyst pellets were ground to a powder and digested in acid to form an ionic solution. The solution was then measured by AA or ICP to determine Mo ion concentration, which was then adjusted to $MoO_3$ concentration. Alumina ($Al_2O_3$) concentration was back-calculated from the direct measurement of the concentrations of the other components (e.g., Ni, Fe, Na, S).

The HDS Microactivity Test (HDS-MAT) was used to evaluate the intrinsic activity of catalysts in the absence of diffusion and using a model sulfur compound as a probe. The catalyst, ground to a 30–60 mesh fraction, is presulfided at 750° F. with a 10% $H_2S/H_2$ mixture for 2 hours. The presulfided catalyst is exposed to a benzothiophene-containing feed at 550° F. and flowing hydrogen for approximately four hours. Cuts are taken periodically and analyzed by a gas chromatograph for the conversion of benzothiophene to ethylbenzene. The results obtained with HDS-MAT tests as well as the Mo and Ni gradients of the catalysts described are shown in Tables I and II.

Catalyst Properties

Tables III and IV show the pore volume distributions and surface areas of six silica-alumina supports with silica contents varying from 4 to 16 wt. %. As the silica content was increased from 4 to 16%, the total pore volume (TPV) and the macroporosity (PV>250 Å) increased, whereas the pore volume in the region of PV 100–160 Å decreased. The TPV of the supports was in the range of 0.81 to 1.06 cc/g and the macroporosity was varied from 0.07 to 0.34 cc/g. The pore volume of pores with diameters in the range of 100–160 Å was varied from 0.24 to 0.56 cc/g or 32 to 72% of the pore volume of pores having diameters less than 250 Å. A comparison of the pore volume distributions between the support and the finished catalyst indicated that the pore volume in the region of PV 100–160 Å was maintained essentially the same after impregnation of active metals.

There is another unique feature of this type of silica-alumina in contrast to the conventional silica-alumina used in the cracking and hydrocracking catalysts. That is, the acidity of the supports, shown in Table III as $NH_4$ desorbed, does not depend on the silica content. The method employed to incorporate silica sol into the alumina gel is not effective for enhancing the acidity function of the support and the finished catalysts.

The properties of five silica-alumina based NiMo catalysts are compared in Table I. Three kinds of impregnation stabilizers, hydrogen peroxide, citric acid and phosphoric acid, were used in the co-impregnation of Ni and Mo onto the silica-alumina supports. It is seen that the HDS-MAT activity decreases with increasing silica content. All of the catalysts listed in Table I except the citric acid stabilized SN-6616 show high Mo gradients. To improve the HDS-MAT activity of NiMo catalysts on silica-alumina supports of 16% silica, the calcination temperature was lowered to 1100° F. (in the cases of SN-6922 and SN-6923). As seen in Table II, the HDS-MAT activities of SN-6601 and SN-6923 are significantly higher than SN-6601 and SN-6615. By contrast, the Mo gradients of SN-6922 and SN-6923 are significantly lower than that of SN-6601. Therefore, the citric acid is the most effective impregnation stabilizer to achieve high dispersion of Mo and uniform laydown of Mo across the catalyst extrudates.

BERTY REACTOR HYDROCRACKING CATALYST EVALUATION

The Berty reactor, a type of continuous stirred tank reactor (CSTR), was used to determine hydrocracking activities of the catalysts of this invention in a diffusion controlled regime at a low rate of deactivation. The catalysts were presulfided and then the reaction was carried out at a single space velocity for 38 hours. The sample cuts were taken every 4 hours and tested for boiling point distribution, Ni, V, S, and sediment content. Using these data, conversions for the 650° F.+ and 1000° F.+ fractions were determined. The feedstock properties and the operating conditions of the Berty reactor are listed in Table VI which follows.

The hydrocracking activity was determined by comparing the percentages of products in the 650° F.– fraction and 1000° F.– fraction when various catalysts were evaluated under constant mild hydrocracking conditions with the same feedstock. The conversions of 650° F.+ and 1000° F.+ were calculated by the equations below:

$$\text{Conversion} = \frac{Y(F) - Y(P)}{Y(F)} \times 1000\%$$

Y(F) denotes the volume percentage of the 650° F.+ or 1000° F.+ fraction in the feedstock.
Y(P) denotes the volume percentage of the 650° F.+ or 1000° F.+ fraction in the products.

The boiling point distribution of the total product was determined using the ASTM D-2887 Method, Simulated Distillation by Gas Chromatography. The existent sediment content in the total product was measured by using the IP 375/86 Method, Total Sediment in Residual Fuels. The Total Sediment is the sum of the insoluble organic and inorganic material which is separated from the bulk of the residual fuel oil by filtration through a filter medium, and which is also insoluble in a predominantly paraffinic solvent.

TABLE VI

BERTY REACTOR OPERATING CONDITIONS

| 1. PRESULFIDING | |
|---|---|
| Temperature | 750°–800° F. |
| Pressure | 40 Psig |
| Gas Mixture | 10 Vol % $H_2S$ - 90 Vol % $H_2$ |
| Gas Flow | 500 sccm |
| Duration | 2 Hr., 45 Min. |
| 2. FEEDSTOCK | |
| | 60 Vol % Desulfurized VGO |
| | 40 Vol % Ar M/H Vac. Resid |
| Boiling Point | IBP 444° F. |
| Distribution | FBP 1371° F. |
| | 650° F.+ 89.2 Vol % |
| | 900° F.+ 45.6 Vol % |
| | 1000° F.+ 33.5 Vol % |
| Sulfur wt % | 2.2 |
| Ni Content, ppm | 20 |

TABLE VI-continued

BERTY REACTOR OPERATING CONDITIONS

| V Content, ppm | 54 |
|---|---|
| 3. REACTION CONDITIONS | |
| Temperature | 805° F. |
| Pressure | 1000 Psig |
| Hydrogen Feed Rate | 300 SCCM |
| Liquid Feed Rate | 82.5 CC/HR |
| Liquid Holdup | 125 CC |
| Catalyst Charge | 36.9 Grams |

Data listed in Table VII, which follows, show the activity results achieved with Catalysts SN-6599, 6600, 6601 and 6616 of this invention compared to the activities exhibited by Catalyst A (the reference catalyst) and Catalyst B, which are both commercial hydroprocessing catalysts, as determined in the Berty Reactor tests.

The data presented in Table VII show that Catalysts SN-6599, 6600, 6601 and 6616, catalysts of this invention, have a substantially greater activity for the 650° F.+ conversion value than Catalyst A; that Catalysts SN-6600 and 6616 exhibit a greater activity for the 650° F.+ conversion than Catalyst B while Catalyst SN-6601 has a 650° F.+ conversion value about equal to Catalyst B and Catalyst SN-6599 exhibits a 650° F.+ conversion value somewhat less than Catalyst B. Catalysts SN-6599, 6600, 6601 and 6616 all show a 1000° F.+ conversion value greater than Catalysts A or B.

TABLE VII

BERTY RESID MILD HYDROCRACKING ACTIVITIES

| Catalyst | 650° F.+ Conversion Vol % | 1000° F.+ Conversion Vol % | IP Sediment ξ | HDM Act. % | HDS Act. % |
|---|---|---|---|---|---|
| A | 29 | 78 | 0.7 | 80 | 69 |
| B | 45 | 83 | 0.9 | 60 | 71 |
| *SN-6599 | 40 | 86 | 0.6 | 62 | 68 |
| *SN-6600 | 48 | 91 | 0.6 | 81 | 72 |
| *SN-6601 | 44 | 89 | 0.5 | 78 | 55 |
| *SN-6616 | 48 | 92 | 0.4 | 72 | 62 |

Run conditions: Temperature = 805° F., Pressure = 1000 psig, LHSV = 0.66, Hydrogen Flow Rate = 300 scc/m, and the feedstock is 40 Vol % Arabian Medium/Arabian Heavy (65:35 Vol %) vacuum resid in desulfurized vacuum gas oil.
*Catalyst of the instant invention.

Two commercial alumina-based hydroprocessing catalysts, Catalyst A (i.e., Catalyst HDS-1443B) and Catalyst B were used as the reference in the evaluation for MHC activities. A comparison of conversion advantages over Catalyst A which has a bimodal pore structure is set out in the data presented in Table VIII which follows.

TABLE VIII

BERTY RESID MILD HYDROCRACKING ACTIVITIES

| Catalyst | 650° F.+ Conversion Advantage Vol % | 1000° F.+ Conversion Advantage Vol % | IP Sediment Delta % |
|---|---|---|---|
| A | 0 | 0 | 0 |
| B | +16 | +5 | +0.2 |
| *SN-6599 | +11 | +8 | −0.1 |
| *SN-6600 | +19 | +13 | −0.1 |

TABLE VIII-continued

BERTY RESID MILD HYDROCRACKING ACTIVITIES

| Catalyst | 650° F.+ Conversion Advantage Vol % | 1000° F.+ Conversion Advantage Vol % | IP Sediment Delta % |
|---|---|---|---|
| *SN-6601 | +15 | +11 | −0.2 |
| *SN-6616 | +19 | +14 | −0.3 |

Run conditions: Temperature = 805° F., Pressure = 1000 psig, LHSV = 0.66, Hydrogen Flow Rate = 300 scc/m, and the feedstock is 40 Vol % Arabian Medium/Arabian Heavy (65:35 Vol %) vacuum resid in desulfurized vacuum gas oil.
*Catalyst of the instant invention.

The data presented in Table VIII show that Catalysts SN-6599, 6600, 6601 and 6616, catalysts of the instant invention, exhibit an increase of 11 to 19 Vol % in 650° F.+ conversion which corresponds to a 37.9 to 65.5% improvement in relative conversion over that achieved with Catalyst A (i.e., the standard base commercial catalyst). Catalysts SN-6599, 6600, 6601 and 6616 also gave an appreciable improvement in the 1000° F.+ conversion ranging from 8 to 14 Vol % which corresponds to a 10.3 to 17.9% improvement over that achieved with Catalyst A. The IP sediment make of these same catalysts showed a decrease of 0.1 to 0.3% over the sediment make of Catalyst A.

The results set out in Table VIII clearly indicate that the silica-alumina based catalyst substantially outperforms Catalyst A or B of the prior art.

Mild hydrocracking of heavy oils containing resids in the presence of the catalyst of this invention comprising, for example, molybdenum oxide, nickel oxide, and, optionally, phosphorus oxide on the silica-alumina support having a specified pore size distribution not only allows an increased production of middle distillate and more effective conversion of resid feedstocks but also maintains the sediment make at a low level or similar to that achieved with conventional bimodal alumina-based catalysts.

What is claimed is:

1. A catalyst useful for mild hydrocracking of a hydrocarbon feedstock having a substantial proportion of components boiling below about 1000° F. comprising about 2.0 to about 6.0 wt. % of an oxide of a Group VIII metal; about 12.0 to about 25.0 wt. % of an oxide of molybdenum and 0 to about 3.0 wt. % of an oxide of phosphorus all supported on a porous alumina support containing about 10.0 to about 25.0 wt. %, based on the weight of the support; of silica in such a manner that the molybdenum gradient of the catalyst has a value between about 1 and about 10 and wherein the catalyst is further characterized by having a total surface area of about 150 to about 250 $m^2/g$ and a total pore volume of about 0.75 to about 0.92 cc/g with a pore diameter distribution such that pores having diameters of less than 100 Å constitute about 20.0 to about 40.0%, pores having diameters of 100–160 Å constitute 28.4 to 34.1%; pores having diameters less than 160 Å constitute about 50.0 to about 70.0%, pores having diameters greater than 160 Å constitute about 30.0 to about 50.0%, of the total pore volume of the said catalyst and macropores having diameters greater than 250 Å constitute about 25.0 to about 40.0% of the total pore volume of said catalyst.

2. The catalyst of claim 1 wherein the said catalyst contains about 0.1 to about 2.0 wt. % of phosphorus oxide.

3. The catalyst of claim 1 wherein the said Group VIII metal is selected from the group consisting of nickel and cobalt.

4. The catalyst of claim 1 wherein the said Group VIII metal is nickel.

5. The catalyst of claim 1 wherein the said Group VIII metal is cobalt.

6. The catalyst of claim 1 wherein the said catalyst comprises about 2.5 to about 3.5 wt. % NiO and about 12.0 to about 18.0 wt. % $MoO_3$ supported on the said porous alumina support containing about 16 to about 25.0 wt. % of silica based on the weight of the support.

7. The catalyst of claim 1 wherein the molybdenum gradient of the catalyst has a value between about 1 and about 10.

* * * * *